REENFORCED BAGS

Original Filed Feb. 25, 1959 2 Sheets-Sheet 1

INVENTOR.
ROBERT G. NICHOLS
BY Woodling & Kroot
ATTORNEYS

REENFORCED BAGS

Original Filed Feb. 25, 1959 2 Sheets-Sheet 2

*INVENTOR.*
ROBERT G. NICHOLS
*BY* Woodling + Krost
ATTORNEYS

United States Patent Office

Re. 25,694
Reissued Dec. 1, 1964

25,694
REENFORCED BAGS

Robert G. Nichols, 211 Skyline Drive, Barrington, Ill.

Original No. 3,097,788, dated July 16, 1963, Ser. No. 176,486, Feb. 23, 1962, which is a continuation of Ser. No. 801,426, Feb. 25, 1959. Application for reissue Nov. 6, 1963, Ser. No. 321,985
4 Claims. (Cl. 229—55)

Matter enclosed in heavy brackets [ ] appears in the original patent but forms no part of this reissue specification; matter printed in italics indicates the additions made by reissue.

The invention relates in general to bags for containing articles and the method of making same and more particularly to bags having an opening strip in the mouth thereof which strip is of such construction that an exceptionally strong and air tight seal is obtained and which bag may be opened by tearing the opening strip from the mouth of the bag.

This application is a continuation of my application Serial No. 801,426 filed February 25, 1959, now abandoned, which in turn is a continuation-in-part of my application Serial No. 681,070, filed August 29, 1957, now abandoned.

An object of the invention is to provide a method of making a bag with an opening strip in the mouth thereof which is secured at first and second spaced portions with an intermediate portion loosely residing in the mouth of the bag.

Another object of the invention is to provide a bag with an opening strip in the mouth thereof which is secured at first and second spaced portions with an intermediate portion loosely residing in the mouth of the bag.

Another object of the invention is to provide a method of making a bag with a fibrous opening strip in the mouth thereof which strip has a heat sealable material secured to both sides thereof with the walls of the bag being of heat sealable material secured to the heat sealable material on both sides of the opening strip. This provides an exceptionally strong and air-tight seal and when the opening strip is torn from the mouth of the bag the heat sealable material on the strip separates from the fibrous material of the strip rather than from the heat sealable material of the bag.

Another object of the invention is to provide a bag with a fibrous opening strip in the mouth thereof which strip has a heat sealable material secured to both sides thereof with the walls of the bag being of heat sealable material secured to the heat sealable material on both sides of the opening strip.

Another object of the invention is to provide a polyethylene bag with a paper type opening strip in the mouth thereof which strip has polyethylene extruded on both sides thereof with the polyethylene walls of the bag being heat and/or pressure sealed to the polyethylene on both sides of the opening strip.

Another object of the invention is to provide a bag with an opening strip in the mouth thereof with the walls of the bag sealed to the strip, the strip having shoulders thereon to locate the strip in the mouth of the bag.

Another object of the invention is to provide a bag having an upper open end with a card or strip member therein and with the bag sealed to the strip member on one side and not on the other.

Another object of the invention is to provide a bag having front and back panels of heat sealable material sealed together at opposed edges to form an open end in the bag within which a strip member resides with only one of the panels being secured to one side of the strip member at first and second end portions thereof only or along the complete length thereof.

Another object of the invention is to provide a bag constructed of a plastic film which can be opened with little or no difficulty.

Other objects and a fuller understanding of this invention may be had by referring to the following description and claims, taken in conjunction with the accompanying drawings, in which:

Figure 1:
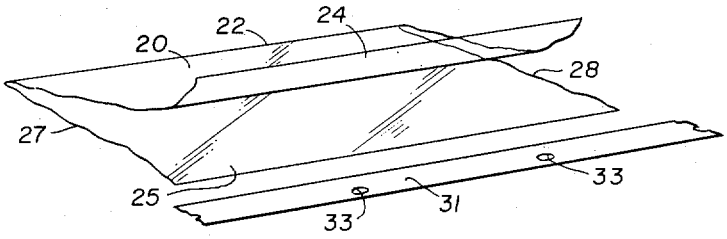
FIG. 1 is an exploded isometric view of a folded sheet of polyethylene of any length and a paper strip coated on both sides of any length which are used in making a bag according to the teachings of the present invention.
Figure 2:
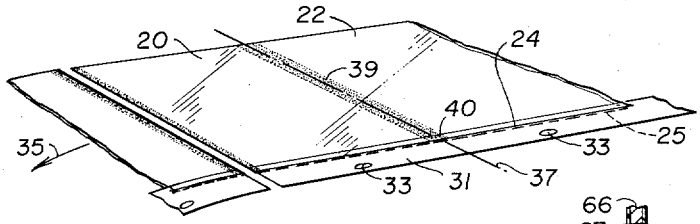
FIG. 2 is an isometric view of the parts of FIG. 1 in proper relationship to each other and adapted to travel in the direction of the arrow as along a continuous production line to sealing and cutting stations as indicated schematically by the dot-dash line.

The method of making one of the bags of the present invention is best shown in FIGS. 1 and 2 of the drawings. This method includes the steps of selecting a first sheet 20 of polyethylene. In FIGS. 1 and 2, this sheet of polyethylene has been broken at either end to indicate that the sheet may be of any practical length. This polyethylene sheet 20 is folded upon itself to form a folded edge 22 at one side portion and first and second adjacent edge portions 24 and 25, respectively, at the other side portion. The edges 24 and 25 of the polyethylene sheet 20 may also be referred to as first and second edge portions and for the purpose of description, the sheet 20 may also be said to have third and fourth edge portions 27 and 28, respectively. The next step in making the bag is that of selecting a second sheet 31 which, in FIGS. 1 and 2, has also been broken at both ends to indicate that it may be of any practical length. This second sheet 31 is constructed of fibrous material and more preferably of paper or cardboard. In FIGS. 1 and 2, the second sheet 31 is made up of a super calendered twenty-five pound paper and this paper has been laminated on both sides with .0005 inch of polyethylene. The polyethylene is put on the paper by extruding the same while hot onto the twenty-five pound paper. By extruding the polyethylene on the paper while hot, this causes the polyethylene to soak into the interstices of the paper itself providing a very good bond therebetween. The first and second sheets 20 and 31, respectively, in FIG. 1, have been shown in an exploded view to better show the two sheets of material. The second sheet 31 is positioned between the first and second adjacent edge portions 24 and 25, respectively, of the first sheet 20, as best shown in FIG. 2. It will also be noted that the second sheet 31 has been provided with holes 33 at spaced intervals. Each of the holes will be included in one of the finished bags.

The assembled first and second sheets 20 and 31, respectively, are moved together to sealing and cutting stations in a direction generally corresponding with the directional arrow 35. In FIG. 2, the sealing and cutting stations have been indicated only schematically by the dot-dash line 37. It should be readily recognized that many different types of sealing and cutting apparatus may be utilized at this station to seal and then cut the sheets of material. The folded first sheet 20 is sealed at 39 along what might be referred to as a first line which extends between the folded edge 22 and adjacent edge portions 24 and 25, respectively. This also seals a portion of the second sheet 31 between the adjacent edge portions 24 and 25, as at 40. This cutting and sealing operation along the above referred to first line forms a portion of two bags since the seal is cut substantially down the middle. When the first and second sheets are again advanced to the cutting station, the same sealing and cutting operation is performed along what might be referred to as a second line to finish the other side of the above referred to bag and complete one side of the next bag. In FIG. 2, a complete bag is shown as severed from the two sheets of material.

Figure 3:
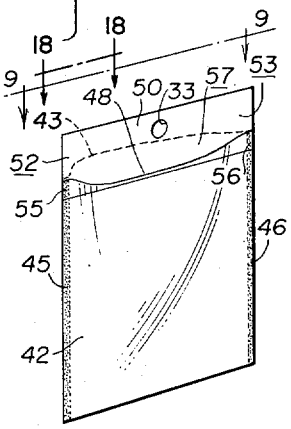
FIG. 3 is an isometric view of a bag made in FIG. 2.

FIG. 3 is an isometric view of the bag made by the hereinabove described method and as will be noted, this bag includes front and back panels of polyethylene material 42 and 43, respectively. Each of the front and back panels 42 and 43 has first and second edge portions 45 and 46 which are sealed together by means of heat and/or pressure to form a bag having an open end 48. The bag includes a polyethylene coated paper strip 50 or opening strip, as it will sometimes be referred to. This opening strip 50 resides in the open end 48 of the bag and has first and second end portions 52 and 53, respectively. The first end portion 52 of the opening strip 50 is bonded between the first edge portion 45 of the front and back panels 42 and 43, respectively, as at 55, and the second end portion 53 of the opening strip is bonded between the second edge portion 46 of the front and back panels, as at 56. As will be noted in FIG. 9, which is a plan view of the bag shown in FIG. 3, an intermediate portion 57 of the opening strip loosely resides in the open end 48 of the bag. The hole 33 in the opening strip 50 serves the purpose of enabling one to hang the bag on a suitable type hanger for storing the same either awaiting use or accomplishing its purpose in containing articles of commerce.

Figure 9:
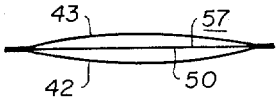
FIG. 9 is a view taken along the line 9—9 of FIG. 3.
Figure 11:
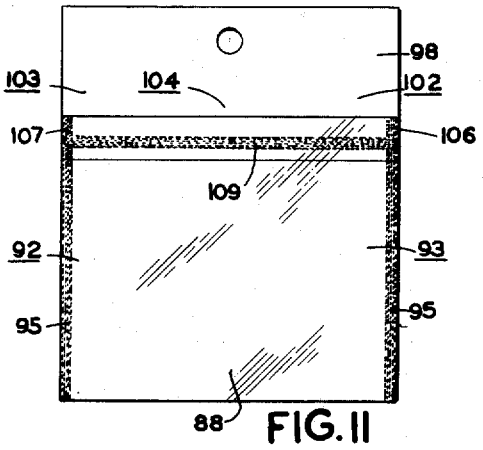
FIG. 11 is a side elevational view of another bag made under the teachings of the present invention.
Figure 12:
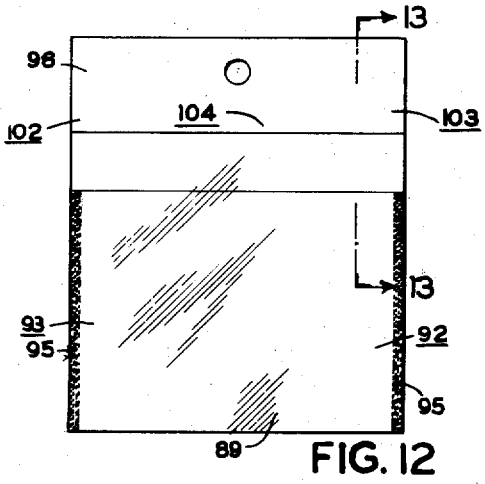
FIG. 12 is a view of the bag of FIG. 11 taken from the back.

The strip of material in the bag, shown and illustrated in FIGS. 3 and 9, serves the purpose of acting as a leaf or an entering strip which extends into the opening 48 in the top of the bag between the front and back panels 42 and 43. In bags of polyethylene, this is highly desirable since the material where the open end of the bag is formed tends to adhere rather tenaciously, thus making it extremely difficult to open the bag to put material into the same. The strip 50 also serves the purpose of allowing printing or marking to be put on the surface thereof so that additional labels or markings which are usually attached by way of stapling or the like, may be obviated.

In the event that it is desired to have a bag which is air tight, one further step is performed on the bag which is shown in FIGS. 3 and 9. This step has been shown in FIG. 4 and includes sealing the intermediate portion 57 of the strip 50 between the first and second end portions 52 and 53. The apparatus for accomplishing this step has been shown only schematically but includes a pair of heated rollers 60 which are urged together while the bag is passed therebetween in the general direction shown by the arrow 62 in FIG. 4. This step produces a seal 63 along what was the open end of the bag just prior to the step. The bag produced by the step shown in FIG. 4 has again been shown in FIG. 5. A sectional view has been taken along the line 6—6 of the bag shown in FIG. 5 to more clearly show the polyethylene which has been laminated on both sides of the paper. In FIG. 6, the twenty-five pound super calendered paper has been indicated by the reference numeral 66 and the polyethylene coating on either side of the paper has been indicated by the reference numeral 67. The front and back panels of polyethylene material have been indicated by the reference numerals 42 and 43, respectively, the same reference numerals which were applied to FIG. 3. The place at which the front and back panels have been sealed to the polyethylene coating 67 on the paper 66 has been indicated as at 63. In reality, the bond between these two materials at this place is essentially a homogenous mixture with no defined dividing line, but for the sake of clarity and for more ease in illustrating the same, a defined dividing line has been indicated between the front and back panels 42 and 43 and the polyethylene layers 67.

Figure 7:
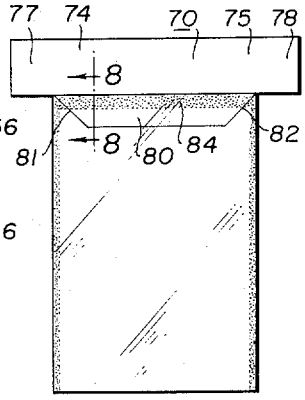
FIG. 7 is a view of another bag made by the teachings of the present invention.
Figure 8:
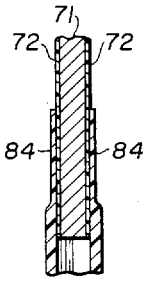
FIG. 8 is a view taken along the line 8—8 of FIG. 7.

FIGS. 7 and 8 illustrate another bag made by the teachings of the present invention. The opening strip in this modification has been indicated by the reference numeral 70 and includes cardboard 71 coated on opposed sides thereof with a layer of polyethylene 72. The polyethylene is applied in much the same manner as described hereinabove. The opening strip 70 includes first and second end portions 74 and 75, respectively. The opening strip 70 also includes first and second shoulders 77 and 78, respectively, integrally formed with the first and second end portions 74 and 75, respectively. An insert tab 80 is integrally formed with a lower portion of the strip and includes converging side walls 81 and 82. As will be noted from FIG. 7, the shoulders 77 and 78 serve the purpose of resting on the wall means which make up the upper peripheral edge of the bag to locate the same with respect thereto and prevents the strip from falling down into the bag. This is extremely desirable when the opening strips have to be individually placed and sealed in the mouth of individual bags. The converging side walls 81 and 82 on the insert tab 80 serve the purpose of allowing for variations in the width of the open end of the bag and still permitting the opening strip to be sealed thereto, as at 84, to provide an air-tight container. When the opening strip 70 is torn from the bag, in order to open the upper end thereof, the cardboard material 71 separates from the polyethylene layers 72 on either side thereof rather than the polyethylene layers 72 separating from the side panels which make up the sides of the bag. This illustrates the exceptionally air-tight seal which is obtained and further illustrates the remarkable strength of the seal between the polyethylene material.

Figure 10:
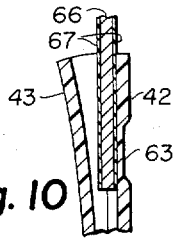
FIG. 10 is a view similar to FIG. 6 but taken of a modified bag constructed in accordance with the teachings of the present invention.
Figure 4:
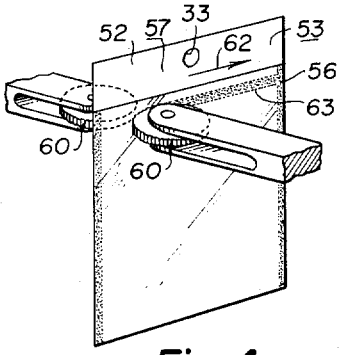
FIG. 4 is an isometric view showing the bag of FIG. 3 having the mouth or open upper end thereof sealed shut.
Figure 5:
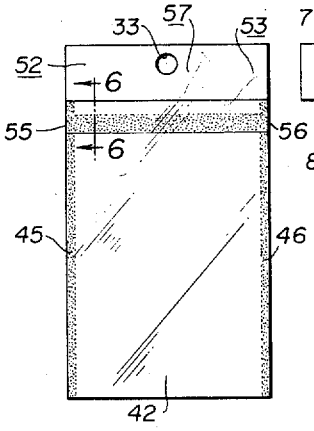
FIG. 5 is a view of the bag formed after the step shown in FIG. 4.
Figure 6:
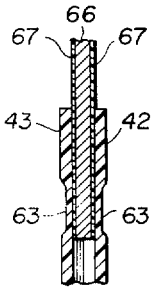
FIG. 6 is a view taken along the line 6—6 of FIG. 5.

FIG. 10 shows a modification of the bags of FIGS. 3 and 5 in that the front panel 42 has been completely sealed along its entire upper edge portion to the opening strip 50. This leaves the back panel 43 sealed to the strip only at the first and second end portions 52 and 53, respectively. The bag shown in FIG. 10 may be produced from the bag shown in FIG. 3 by taking this bag and subjecting it to a sealing operation similar to that described above and shown in FIG. 4 to produce the bag of FIG. 5. The only difference is that only the front roller 60 (FIG. 4) is heated and the back roller serves merely as a back-up roll thereby producing a seal 63 only between the front panel 42 and the polyethylene 67 on the paper 66 at the intermediate portion (FIG. 10). This leaves the back panel 43 loose from the polyethylene 67 on the other side of the paper 66 as is clearly shown in FIG. 10.

The bag shown in FIGS. 11–14 is similar to the bags illustrated in FIGS. 1–10 and includes front and back panels 88 and 89 respectively, of polyethylene. Each of the front and back panels 88 and 89 is provided with first and second edge portions 92 and 93, respectively. The first and second edge portions of the front and back panels are sealed together as at 95 to form an open ended bag. A paper strip 98 which may also be referred to as an opening strip has first and second opposed sides 99 and 100 which are coated with a polyethylene material in a manner which has been well shown and illustrated in FIGS. 6, 8 and 10. The paper strip 98 resides in the open end of the bag (FIGS. 13 and 14) and has first and second end portions 102 and 103 respectively and an intermediate portion 104 therebetween. Only the first opposed side 99 at the first and second end portions 102 and 103 respectively, of the paper strip are bonded to the first and second edge portions of the front panel 88 as indicated at 106 and 107, respectively. The intermediate portion of the first opposed side 99 of the paper strip is sealed to the front panel as indicated at 109. The second opposed side 100 of the paper strip 98 is unattached or in other words is not sealed to the front panel at any place along the extent thereof and specifically not at the first and second end portions or at the intermediate portion. With this particular type of construction, the back panel 89 of the bag adjacent the second side of the paper strip which may be referred to as a flap 97 generally assumes a position away from the paper strip as shown in the full line drawing of FIGS. 13 and 14 and in some instances occupies the dot-dash position 111. It will be appreciated by those skilled in the art that the separating of a plastic film bag such as polyethylene, in order to put material therein, is difficult and by the use of the herein disclosed construction, it is possible to open the bag immediately thereby reducing labor time when using the bag for whatever purpose desired. It will be noted that in the bag disclosed in FIGS. 11–14 the back panel is longer than the front panel, or in other words, extends up higher on the paper strip. The primary reason for this is that the front or first opposed side 99 of the paper strip generally carries advertising material thereon and it is desirable to keep the front panel and seal 109 at the bottom of the paper strip so as not to interfere with any of the advertising material. This seal is generally made by a manufacturer of the bag. The bag is finally sealed by a purchaser thereof and as a result, the back panel is made longer whereby a more unskilled seal may be made. This is acceptable because there is usually no advertising material on the back of the strip.

Figure 15:
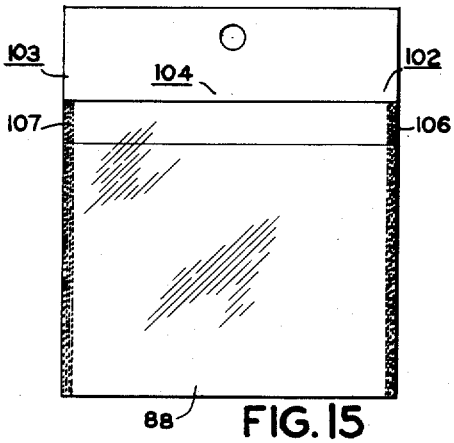
FIG. 15 is a view similar to FIG. 12 showing a modified form of the bag.
Figure 16:
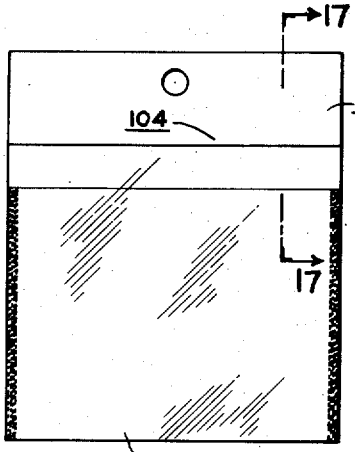
FIG. 16 is a view of the bag of FIG. 15 taken from the back.
Figure 17:
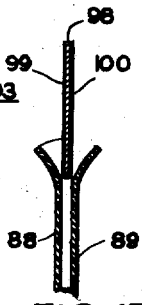
FIG. 17 is a view taken generally along the line 17—17 of FIG. 16.
Figure 14:
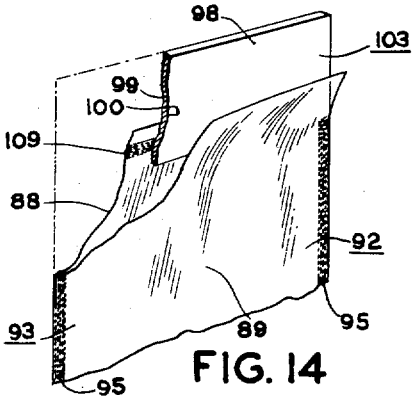
FIG. 14 is a fragmentary isometric view partially in section of the bag shown in FIG. 12.
Figure 13:
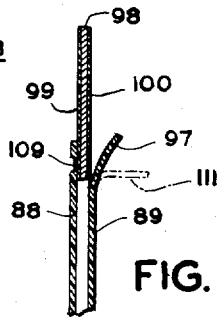
FIG. 13 is a view taken generally along the line 13—13 of FIG. 12.
Figure 18:
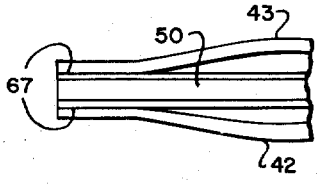
FIG. 18 is a partial view on an enlarged scale of the open end of the bag shown in FIG. 3.

The bag shown in FIGS. 15–17 is generally similar to that shown in FIGS. 11–14 and where like structure results, identical reference numerals have been utilized. The major difference in the construction is seen in FIGS. 15 and 17 wherein the front panel 88 is sealed only to the first and second end portions of the paper strip and no seal has been utilized at the intermediate portion 104 of the paper strip which has not been sealed to the front panel 88. As mentioned hereinabove, the end portions 102 and 103 of the first side 99 of the paper strip have been sealed to the front panel. The back panel 89 of the bag shown in FIGS. 15–17 is the same as the back panel shown in the bag of FIGS. 11–14 with the exception that it has been made substantially the same length as the front panel.

It will thus be seen from the teachings of the present invention that with the use of the heat sealable polyethylene material in combination with the opening strip which has been utilized in the mouth of the bag that an extremely strong seal may be obtained and yet the bag may be relatively easily opened by grasping the opening strip and simply tearing the same from the mouth of the bag. The opening strip also provides a convenient means of marking different bags which are to be used for different purposes or for carrying advertising media thereon. The utility and desirability of a bag, as shown in FIGS. 3 and 9, has been disclosed hereinabove, but the best use of this type is to enable one to more quickly get into the bag to deposit material therein even when resorting to the step shown in FIG. 4, thereafter. The step shown in FIG. 4 is not at all times performed since for many uses the user does not care whether the bag is provided with a hermetic seal or not.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

I claim:

1. A bag, including a polyethylene sheet folded on itself to provide front and back panels and having an open end spaced from the panel-providing fold line, said front and back panels each having first and second edge portions extending transversely of the panel-providing fold line, means sealing said first and second edge portions of said front and back panels together except immediately adjacent said open end to provide thereby end flaps, a paper strip having first and second sides coated with polyethylene and positioned in said open end of said bag, said strip having a dimension parallel to said fold line equal to the distance between the first and second edges of each of said panels and a dimension perpendicular to said fold line greater than the flap dimension perpendicular to said fold line, said paper strip being bonded to only one of said end flaps.

2. A bag, including a sheet of thermoplastic film material folded on itself to provide front and back panels and having an open end spaced from the panel-providing fold line, said front and back panels each having first and second edge portions extending transversely of the panel-providing fold line, means sealing said first and second edge portions of said front and back panels together to form an envelope open at the fourth side, the envelope-defining bonds adjacent said fourth side terminating short of said fourth side to provide end flaps on said front and back panels, a paper strip having first and second sides coated with thermoplastic film material heat bondable to the first-named film material and positioned in said open end of said envelope, said strip having a dimension parallel to said fold line substantially equal to the distance between the first and second edges of each of said panels and a dimension perpendicular to said fold line greater than the flap dimension perpendicular to said fold line, said strip extending but part way into the envelope, said paper strip being heat bonded to only one of said end flaps, and said other flap at the opposed unbonded ends thereof defining slits facilitating the unfolding of said other flap to provide access to the envelope with the bonds adjacent said fourth side opposing the tendency of the slits to enlarge.

*3. A bag, including a polyethylene sheet folded on itself to provide front and back panels and having an open end spaced from the panel-providing fold line, said front and back panels each having first and second edge portions extending transversely of the panel-providing fold line, means sealing said first and second edge portions of said front and back panels together except immediately adjacent said open end to provide thereby end flaps, a paper strip having first and second sides and of which at least one such side is coated with polyethylene and positioned in said open end of said bag, said strip having a dimension parallel to said fold line equal to the distance between the first and second edges of each of said panels and a dimension perpendicular to said fold line greater*

*than the flap dimension perpendicular to said fold line, said paper strip being bonded to only one of said end flaps and at said one side thereof.*

*4. A bag, including a sheet of thermoplastic film material folded on itself to provide front and back panels and having an open end spaced from the panel-providing fold line, said front and back panels each having first and second edge portions extending transversely of the panel-providing fold line, means sealing said first and second edge portions of said front and back panels together to form an envelope open at the fourth side, the envelope-defining bonds adjacent said fourth side terminating short of said fourth side to provide end flaps on said front and back panels, a paper strip having first and second sides and of which at least one such side is coated with thermoplastic film material heat bondable to the first-named film material and positioned in said open end of said envelope, said strip having a dimension parallel to said fold line substantially equal to the distance between the first and second edges of each of said panels and a dimension perpendicular to said fold line greater than the flap dimension perpendicular to said fold line, said strip extending but*

*part way into the envelope, said paper strip being heat bonded to only one of said end flaps and at said one side thereof, and said other flap at the opposed unbonded ends thereof defining slits facilitating the unfolding of said other flap to provide access to the envelope with the bonds adjacent said fourth side opposing the tendency of the slits to enlarge.*

References Cited by the Examiner

The following references, cited by the Examiner, are of record in the patented file of this patent or the original patent.

UNITED STATES PATENTS

| | | | |
|---|---|---|---|
| 2,480,500 | 8/49 | Moore | 229—62 |
| 2,620,842 | 12/52 | Hoeppner et al. | |
| 2,663,415 | 12/53 | Roehm. | |
| 2,819,010 | 1/58 | Amiguet | 229—62 |
| 3,011,689 | 12/61 | Korn et al. | |
| 3,024,962 | 3/62 | Meister | 229—62 |

FRANKLIN T. GARRETT, *Primary Examiner.*